No. 723,366. PATENTED MAR. 24, 1903.
W. CLAPP.
VEHICLE TIRE.
APPLICATION FILED DEC. 8, 1902.

NO MODEL.

Witnesses
E. H. Stewart
C. H. Woodward

William Clapp, Inventor.
by C. A. Snow & Co
Attorneys

UNITED STATES PATENT OFFICE.

WILLIAM CLAPP, OF VALPARAISO, INDIANA.

VEHICLE-TIRE.

SPECIFICATION forming part of Letters Patent No. 723,366, dated March 24, 1903.

Application filed December 8, 1902. Serial No. 134,384. (No model.)

*To all whom it may concern:*

Be it known that I, WILLIAM CLAPP, a citizen of the United States, residing at Valparaiso, in the county of Porter and State of Indiana, have invented a new and useful Vehicle-Tire, of which the following is a specification.

This invention relates to means for protecting pneumatic tires from punctures, and has for its object the production of a simply constructed and applied means for effectually preventing the puncture of pneumatic tires without adding materially to the expense or weight of the tire; and the invention consists in a relatively thin metal ribbon curved transversely and longitudinally to conform to the shape of the tire and covered with a canvas envelop upon both sides and extending beyond both edges and embedded in the material of the tire, with the tire material impregnating and commingling with the canvas envelop.

The invention further consists in a ribbon of relatively thin metal curved transversely and longitudinally and inclosed in a fabric envelop covering both sides and extending beyond both edges, the metal ribbon having spaced apertures along the edges to enable the fabric envelop to be secured in place by stitches passed through the apertures and likewise through the fabric inclosure and embedding the ribbon thus protected in the material of the tire.

Other novel features of the invention will be disclosed in the annexed description and be specified in the claims following.

Figure 1:
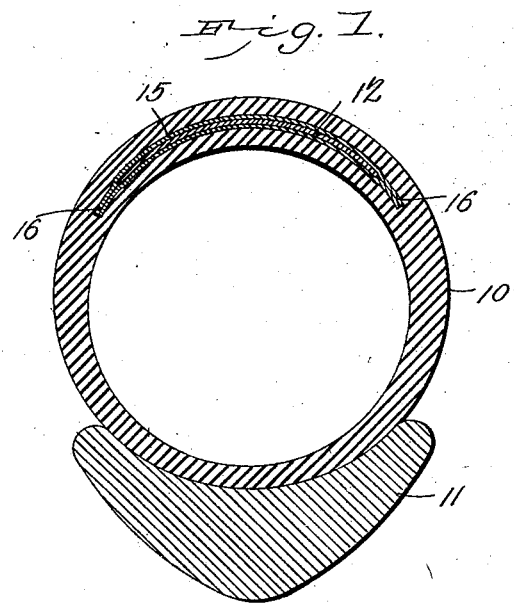
Figure 2:
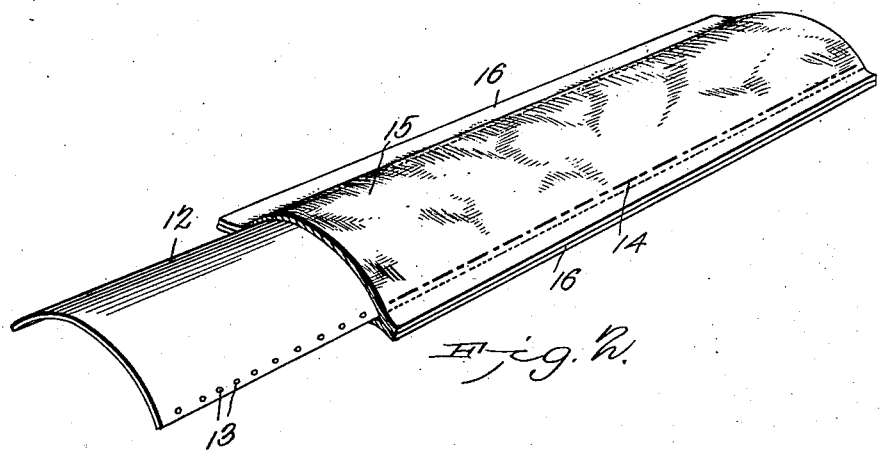

In the drawings illustrative of the invention, in which corresponding parts are designated by like characters in both figures, Figure 1 is a transverse section of a bicycle-tire with the improvement applied. Fig. 2 is a perspective view of a portion of the protecting-strip detached.

The improved device may be employed in connection with any form of pneumatic tire, either those employed upon ordinary bicycles or those employed upon the various forms of automatic vehicles, and I do not wish to be limited in the use of the device to any form or size of tire to which it may be employed, and therefore reserve the right to its use in any locality or for any purpose to which it is adapted.

For the purpose of illustration the improved device is shown applied to an ordinary make of bicycle-tire (indicated at 10) and a section of the supporting-rim (indicated at 11.)

The improved device consists in a comparatively thin metal ribbon 12, curved transversely to conform to the transverse curve of the tire and also curved longitudinally to conform to the circumference of the tire and provided with spaced apertures 13 along the edges. The ribbon 12 will be inclosed in a fabric envelop 15, preferably of canvas of suitable texture, the fabric envelop covering both sides of the ribbon and extending for a considerable distance beyond both edges, as at 16, so that the ribbon is entirely protected and covered and no portion exposed, and flexible extensions formed upon each side. The ribbon thus formed and protected will be embedded within the material of the tire at the outer side or tread of the tire in position to protect the inclosed inflated portion, as illustrated in Fig. 1. By this means the tire is protected from the direct line of the impact from tacks, glass, sharp stones, or other articles which are liable to produce punctures, while the flexible extensions 16 will project on opposite sides of the tread, where the puncturing articles would be liable to enter tangentially and engage the portions 16 at an angle, the flexible portions being of sufficient tenacity to deflect the glancing impact to which they would be subjected. By this simple arrangement the tread of the tire is efficiently protected by the metal ribbon, and the sides are protected with equal efficiency by the flexible extensions, where the less direct action of the puncturing medium occurs and where a less rigid protection is required. By this means also the tire is amply protected at all vulnerable points and the protecting means so constructed and distributed as to effect the required results without materially increasing the weight or expense or in any manner affecting the resiliency of the tire.

The fabric covering 15 will preferably be connected to the ribbon member 12 by threads or twine stitched through the apertures 13, as indicated at 14, to still further increase the strength of the connection between the parts. The material of the tire will be commingled with and thoroughly impregnate the fabric envelop, which thus becomes a permanent portion of the tire. The metal ribbon thus protected and inclosed will not come in contact with the material of the tire, which is of comparatively soft substance, so that the friction between the metal and its fabric envelop will not be transmitted to the tire material. By this simple means puncturing will be entirely prevented and the "life" of the tire materially increased. The metal ribbon 12 also materially increases the strength and stiffness of the tire without affecting its resiliency.

The metal ribbon and its fabric protection may be of any desired relative thickness and of any required relative width.

Having thus described the invention, what is claimed is—

1. A protector for pneumatic tires consisting of a ribbon of metal curving transversely and longitudinally and having spaced apertures along its edges, and an inclosing fabric covering upon both sides and extending beyond both edges of the metal ribbon and secured thereto by stitches through said apertures and the covering, and embedded in the material of the tire, substantially as described.

2. As a new article of manufacture, a protector for pneumatic tires consisting of a ribbon of metal curved transversely and longitudinally and provided with spaced apertures along its edges and inclosed in a canvas covering extending over both sides and beyond both edges of the metal ribbon and secured thereto by stitches through said apertures and the canvas covering, substantially as described.

In testimony that I claim the foregoing as my own I have hereto affixed my signature in the presence of two witnesses.

WILLIAM CLAPP.

Witnesses:
CHAS. L. BLINE,
JOHN M. RIORDAN.